(12) United States Patent
Kayama et al.

(10) Patent No.: US 7,830,761 B2
(45) Date of Patent: Nov. 9, 2010

(54) OPTICAL DISK APPARATUS

(75) Inventors: Hiroshi Kayama, Osaka (JP); Hiroaki Matsumiya, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 559 days.

(21) Appl. No.: 11/908,519

(22) PCT Filed: Mar. 20, 2006

(86) PCT No.: PCT/JP2006/305550
§ 371 (c)(1),
(2), (4) Date: Sep. 13, 2007

(87) PCT Pub. No.: WO2006/101077
PCT Pub. Date: Sep. 28, 2006

(65) Prior Publication Data
US 2009/0010119 A1    Jan. 8, 2009

(30) Foreign Application Priority Data
Mar. 22, 2005 (JP) .............................. 2005-080939

(51) Int. Cl.
*G11B 20/00* (2006.01)
(52) U.S. Cl. .............. 369/47.15; 369/47.17; 369/53.17; 369/53.23; 369/53.28
(58) Field of Classification Search ............. 369/47.15, 369/47.17, 53.17, 53.23, 53.28
See application file for complete search history.

(56) References Cited
U.S. PATENT DOCUMENTS
5,031,167 A * 7/1991 Ishibashi et al. ......... 369/44.34
5,197,054 A * 3/1993 Harada ..................... 369/30.13
(Continued)

FOREIGN PATENT DOCUMENTS

| CN | 1161537 | 10/1997 |
|---|---|---|
| JP | 05-036143 | 2/1993 |
| JP | 05-101394 | 4/1993 |
| JP | 11-339282 | 12/1999 |
| JP | 11339282 A * | 12/1999 |
| JP | 2000-057591 | 2/2000 |

(Continued)

OTHER PUBLICATIONS

Office Action dated Oct. 31, 2008 issued in the corresponding Chinese Patent Application No. 200680004359.X and English translation thereof.
International Search Report for corresponding Application No. PCT/JP2006/305550 mailed Jun. 27, 2006.
PCT/ISA/237 with partial English translation.

*Primary Examiner*—Wayne R Young
*Assistant Examiner*—Brenda Bernardi
(74) *Attorney, Agent, or Firm*—Renner, Otto, Boisselle & Sklar, LLP

(57) ABSTRACT

An optical disk apparatus according to the present invention includes: a rotation driving section on which an optical disk is to be mounted and which drives the optical disk so as to be rotated; a light source; an objective lens for converging light from the light source onto an optical disk mounted on the rotation driving section; a photodetector having at least two detection sections for detecting reflected light, from the optical disk, of the light; and an error signal generation section for deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens.

6 Claims, 10 Drawing Sheets

U.S. PATENT DOCUMENTS

| | | | |
|---|---|---|---|
| 5,894,462 A | | 4/1999 | Hwangbo |
| 5,963,516 A | * | 10/1999 | Hashimoto et al. ........ 369/44.29 |
| 5,986,989 A | * | 11/1999 | Takagi et al. ............. 369/44.34 |
| 6,192,016 B1 | * | 2/2001 | Kim ......................... 369/59.2 |
| 6,426,926 B1 | * | 7/2002 | Sonu ....................... 369/47.17 |
| 6,504,802 B1 | * | 1/2003 | Tsukahara et al. ....... 369/44.35 |
| 6,862,260 B2 | * | 3/2005 | Okazaki ................ 369/124.01 |
| 7,317,673 B2 | * | 1/2008 | Yu ........................... 369/53.23 |
| 7,522,482 B2 | * | 4/2009 | Tateishi et al. ........... 369/44.11 |
| 2005/0041541 A1 | * | 2/2005 | Tateishi et al. ........... 369/44.27 |
| 2005/0057639 A1 | * | 3/2005 | Van Brocklin et al. ...... 347/225 |

FOREIGN PATENT DOCUMENTS

| | | | |
|---|---|---|---|
| JP | 2000057591 A | * | 2/2000 |
| JP | 2001-351238 | | 12/2001 |
| JP | 2003077149 A | * | 3/2003 |
| JP | 2003-257072 | | 9/2003 |
| JP | 2003257072 A | * | 9/2003 |

* cited by examiner (a)   (b)

(a)

(b)

(c)

(a)

(b)

(c)

OPTICAL DISK APPARATUS

TECHNICAL FIELD

The present invention relates to an optical disk apparatus for optically recording data onto an optical disk and reproducing data which is recorded on the optical disk, and to a control method for an optical disk apparatus.

BACKGROUND ART

In an optical disk apparatus, control must be performed so that a light beam which is used for recording or reproduction follows along a track which is provided on an optical disk. This control is called tracking control. It is also necessary to keep a constant convergence state of the light beam which is radiated onto the optical disk. This control is called focus control.

In recent years, optical disks of higher recording densities have been developed. As the recording density of an optical disk increases, the track pitch becomes narrower, and the pits and marks that are formed on a track become smaller in size. This makes it necessary to increase the accuracy of tracking control and focus control of the light beam, and various techniques therefor have been proposed.

A tracking error signal and a focus error signal are utilized for tracking control and focus control. A tracking error signal and a focus error signal are generated by, for example, radiating a light beam onto an optical disk, detecting the light reflected from the optical disk with a plurality of photodetectors, and ascertaining a difference between the outputs obtained from the plurality of photodetectors.

A tracking error signal and a focus error signal rely on the intensity of the light entering the photodetectors. Hence, when the reflectance of the optical disk varies, the sizes of amplitude of the tracking error signal and focus error signal will also vary. Therefore, the tracking control and focus control utilizing the tracking error signal and the focus error signal may possibly become unstable due to the changes in amplitude of these signals.

In order to solve this problem, Patent Document 1 discloses inputting a tracking error signal and a focus error signal to an automatic gain control circuit (AGC circuit), and performing control so that these signals will become constant in amplitude. For example, the AGC circuit divides a tracking error signal or focus error signal by a sum signal which is obtained by adding the signals obtained from the plurality of photodetectors. When the reflected light is weak, the amplitude of the sum signal indicating the intensity of the entire reflected light returning from the optical disk also becomes small. Therefore, with this method, the size of amplitude of the tracking error signal or focus error signal will be adjusted in accordance with the intensity of the reflected light, so that a tracking error signal and a focus error signal having substantially constant amplitude levels can be obtained.

Also studied are techniques which keep a constant amplitude of the tracking error signal or focus error signal by using constructions other than the AGC circuit. For example, Patent Document 2 proposes a method of using laser power to compensate for fluctuations in the size of amplitude. Patent Document 3 discloses a technique of rotating a wavelength plate inside an optical pickup to change the amount of birefringence, thus adjusting the amount of light received by the photodetectors.

[Patent Document 1] Japanese Laid-Open Patent Publication No. 5-36143
[Patent Document 2] Japanese Laid-Open Patent Publication No. 5-101394
[Patent Document 3] Japanese Laid-Open Patent Publication No. 2001-351238

DISCLOSURE OF INVENTION

Problems to be Solved by the Invention

The aforementioned technique of keeping a constant amplitude of the tracking error signal or focus error signal by means of an AGC circuit can be realized with a simper circuit construction than the techniques disclosed in Patent Documents 2 and 3. Therefore, it is considered to be very convenient in practice.

However, in the presence of reflected light from a surface due to birefringence, etc. of the substrate of the optical disk or in the case where the optical disk includes a plurality of recording layers, reflected light from layers other than the layer in which recording or reproduction takes place (hereinafter collectively referred to as stray light from the optical disk) may occur, thus resulting in the problem of not being able to properly adjust the amplitude by means of an AGC circuit. As a result, even if tracking control and focus control is performed by using the tracking error signal or focus error signal obtained from the AGC circuit, the control is likely to become unstable because of fluctuations in the amplitude of such signals.

The present invention solves such problems of the conventional techniques, and provides an optical disk apparatus which stabilizes the amplitudes of lens position error signals such as a tracking error signal and a focus error signal, and which is capable of performing a stable servo control of the lens position.

Means for Solving the Problems

An optical disk apparatus according to the present invention comprises: a rotation driving section on which an optical disk is to be mounted and which drives the optical disk so as to be rotated; a light source; an objective lens for converging light from the light source onto an optical disk mounted on the rotation driving section; a photodetector having at least two detection sections for detecting reflected light, from the optical disk, of the light; and an error signal generation section for deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens.

In a preferred embodiment, the error signal generation section includes: a subtracter for deriving a difference between the signals respectively obtained from the two detection sections of the photodetector and outputting a difference signal; an adder for deriving a sum of the signals respectively output from the two detection sections of the photodetector and outputting a sum signal; an offset adjustment section for adjusting an offset in the sum signal; and a divider for dividing the difference signal by the sum signal whose offset has been adjusted.

In a preferred embodiment, the offset adjustment section adjusts the offset in the sum signal so that error signals obtained at no less than two different positions along a radial direction of the optical disk have an equal amplitude.

In a preferred embodiment, from the sum signal a value a is adjusted that satisfies: a=(E1×S2−E2×S1)/(E1−E2), where E1 and S1 are amplitudes of the difference signal and the sum signal at a first position on the optical disk; and E2 and S2 are amplitudes of the difference signal and the sum signal at a second position on the optical disk.

In a preferred embodiment, the error signal generation section adjusts offsets superposed on the signals respectively obtained from the two detection sections of the photodetector.

In a preferred embodiment, the error signal generation section includes: first and second offset adjustment sections for adjusting offsets in the signals respectively obtained from the two detection sections of the photodetector; a subtracter for deriving a difference between the signals whose offsets have been adjusted, and outputting a difference signal; an adder for deriving a sum of the signals whose offsets have been adjusted, and outputting a sum signal; and a divider for dividing the difference signal by the sum signal.

In a preferred embodiment, from the signals obtained from the detection sections, the first and second offset adjustment sections adjust values e and f that satisfy: e={E3×(2×S4+E4p−E4n)−E4×(2×S3+E3p−E3n)}/{4×(E3−E4)} and f={E3×(2×S4−E4p+E4n)−E4×(2×S3−E3p+E3n)}/{4×(E3−E4)}, where E3 and S3 are amplitudes of the difference signal and the sum signal at a first position on the optical disk; E3p and E3n are positive and negative components of the amplitude E3 of the difference signal; E4 and S4 are amplitudes of the difference signal and the sum signal at a second position on the optical disk; and E4p and E4n are positive and negative components of the amplitude E3 of the difference signal.

In a preferred embodiment, the error signal is a focus error signal.

In a preferred embodiment, the error signal is a tracking error signal.

In a preferred embodiment, the optical disk includes at least two recording layers.

A control method for an optical disk apparatus according to the present invention is a control method for an optical disk apparatus including: a rotation driving section on which an optical disk is to be mounted and which drives the optical disk so as to be rotated; a light source; an objective lens for converging light from the light source onto an optical disk mounted on the rotation driving section; and a photodetector having at least two detection sections for detecting reflected light, from the optical disk, of the light, the method comprising the step of: deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens.

In a preferred embodiment, the step of generating a position error signal includes: a step of deriving a difference between the signals respectively obtained from the two detection sections of the photodetector and generating a difference signal; a step of deriving a sum of the signals respectively obtained from the two detection sections of the photodetector and generating a sum signal; a step of adjusting an offset in the sum signal; and a step of dividing the difference signal by the sum signal whose offset has been adjusted to generate the position error signal.

In a preferred embodiment, the step of adjusting the offset in the sum signal adjusts the offset in the sum signal so that error signals obtained at no less than two different positions along a radial direction of the optical disk have an equal amplitude.

In a preferred embodiment, the step of adjusting the offset in the sum signal adjusts, from the sum signal, a value a that satisfies: a=(E1×S2−E2×S1)/(E1−E2), where E1 and S1 are amplitudes of the difference signal and the sum signal at a first position on the optical disk; and E2 and S2 are amplitudes of the difference signal and the sum signal at a second position on the optical disk.

In a preferred embodiment, the step of generating the position error signal adjusts offsets superposed on the signals respectively obtained from the two detection sections of the photodetector.

In a preferred embodiment, the step of generating the position error signal includes: a step of adjusting offsets in the signals respectively obtained from the two detection sections of the photodetector; a step of deriving a difference between the signals whose offsets have been adjusted, and generating a difference signal; a step of deriving a sum of the signals whose offsets have been adjusted, and generating a sum signal; and a step of dividing the difference signal by the sum signal to generate the position error signal.

In a preferred embodiment, the step of adjusting the offsets adjusts, from the signals obtained from the detection sections, values e and f that satisfy: e={E3×(2×S4+E4p−E4n)−E4×(2×S3+E3p−E3n)}/{4×(E3−E4)} and f={E3×(2×S4−E4p+E4n)−E4×(2×S3−E3p+E3n)}/{4×(E3−E4)}, where E3 and S3 are amplitudes of the difference signal and the sum signal at a first position on the optical disk; E3p and E3n are positive and negative components of the amplitude E3 of the difference signal; E4 and S4 are amplitudes of the difference signal and the sum signal at a second position on the optical disk; and E4p and E4n are positive and negative components of the amplitude E3 of the difference signal.

In a preferred embodiment, the error signal is a focus error signal.

In a preferred embodiment, the error signal is a tracking error signal.

In a preferred embodiment, the optical disk includes at least two recording layers.

Effects of the Invention

According to the present invention, among a difference signal and a sum signal of respective outputs from two detection sections of a photodetector, an offset in at least the sum signal is adjusted. Therefore, when stray light is uniformly entering the photodetector, dividing the difference signal by the sum signal whose offset has been adjusted makes it possible to obtain a position error signal which has a constant amplitude without influences of the stray light. Thus, an optical disk apparatus is realized which makes it possible to perform servo control with a high stability.

Figure 1:
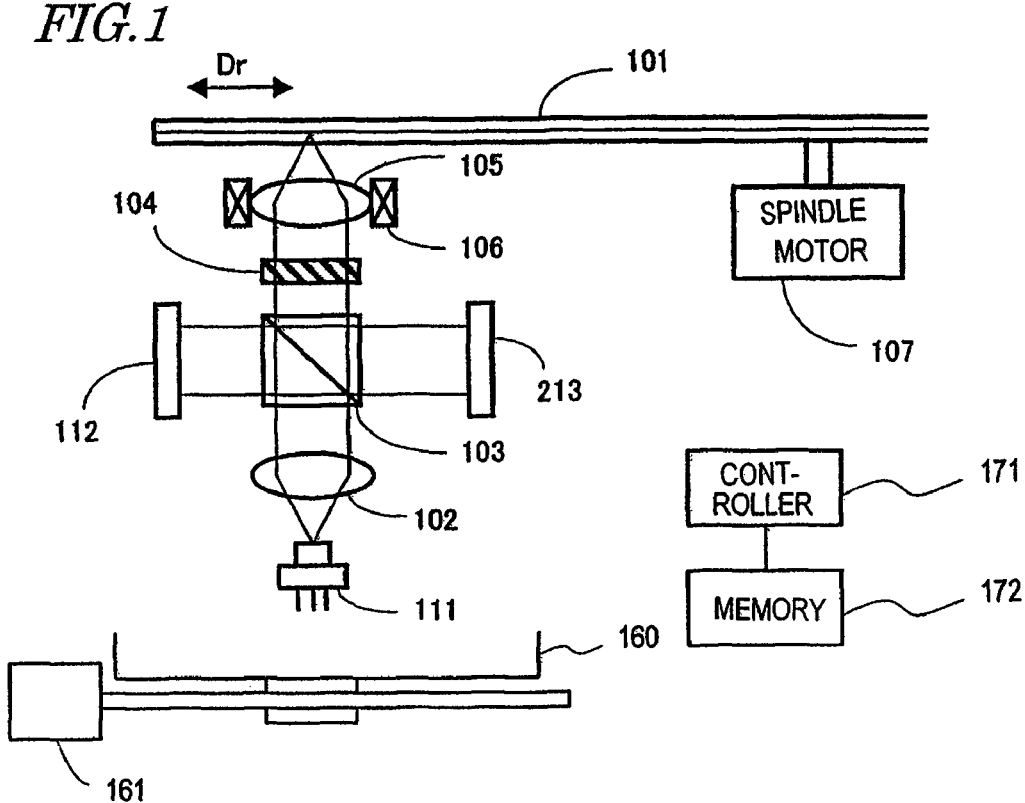
FIG. 1 A diagram showing the construction of a first embodiment of an optical disk apparatus according to the present invention.

DESCRIPTION OF THE REFERENCE NUMERALS 101 optical disk
102 collimating lens
103 PBS
104 ¼ wavelength plate
105 objective lens
106 actuator
107 spindle motor
111 laser
112 frontlight detector
113, 213, 313 photodetector
114 LPC section
116 RF detection section
117, 217, 317 servo control section
121, 122, 123, 124, 126, 128, 221, 222, 223, 224, 226, 228, 321, 322, 323, 324, 326, 328 adder
125, 127, 225, 227, 325, 327 subtracter
129, 130, 229, 230, 329, 330 automatic gain control section
131, 231, 331 focus control section
132, 232, 332 tracking control section
141 divider
142 gain adjustment section
151, 153 reflected light from recording surface of optical disk
152, 154 stray light from optical disk
251, 252, 361, 362, 363, 364 offset adjustment section

BEST MODE FOR CARRYING OUT THE INVENTION

First Embodiment

Hereinafter, a first embodiment of an optical disk apparatus according to the present invention will be described. FIG. 1 generally shows the main structure of the optical disk apparatus of the first embodiment. The optical disk apparatus includes an optical pickup 160 and a spindle motor 107. It also includes a controller 171 composed of a microcomputer or the like for controlling various sections of the optical disk apparatus, and a memory 172 for storing programs such as the controlling procedures.

The spindle motor 107 functions as a rotation driving section on which an optical disk 101 is to be mounted and which drives the optical disk so as to be rotated. The optical pickup 160 radiates toward the optical disk 101 a light beam to be used for recording or reproduction, and detects reflected light which has been reflected from the optical disk 101. The optical pickup 160 is capable of moving along a radial direction of the optical disk 101 by means of a feed motor 161, and in accordance with an instruction from the controller 171, allowing a light beam emitted from the optical pickup 160 to be radiated to an arbitrary position along the radial direction Dr of the optical disk 101.

The optical pickup 160 includes a laser 111 used as a light source to be used for recording or reproduction, and an objective lens 105 functioning as a converging section which converges light emitted from the laser 111 toward the optical disk 101. Moreover, the optical pickup 160 includes a collimating lens 102, a polarization beam splitter (PBS) 103, photodetectors 112 and 213, a ¼ wavelength plate 104, and an actuator 106.

The light which is emitted from the laser 111 is converted by the collimating lens 102 into parallel light, and enters the PBS 103. The PBS 103 reflects a portion of the incoming light toward the photodetector 112. Most of the light is transmitted toward the ¼ wavelength plate 104. At the ¼ wavelength plate 104, the transmitted light is converted in polarization direction, so as to change from linearly polarized light to circularly polarized light, and is converged by the objective lens 105 toward the optical disk 101.

The light which has been reflected from the optical disk 101 is again transmitted through the objective lens 105, and is converted by the ¼ wavelength plate 104 from circularly polarized light to linearly polarized light which is in a direction orthogonal to the forward path. The light entering the PBS 103 is reflected so as to enter the photodetector 113.

Figure 2:
FIGS. 2 (a) and (b) are diagrams showing a construction, in the apparatus of FIG. 1, for processing detection signals which are output from a photodetection section.
Figure 2:
Figure 2:
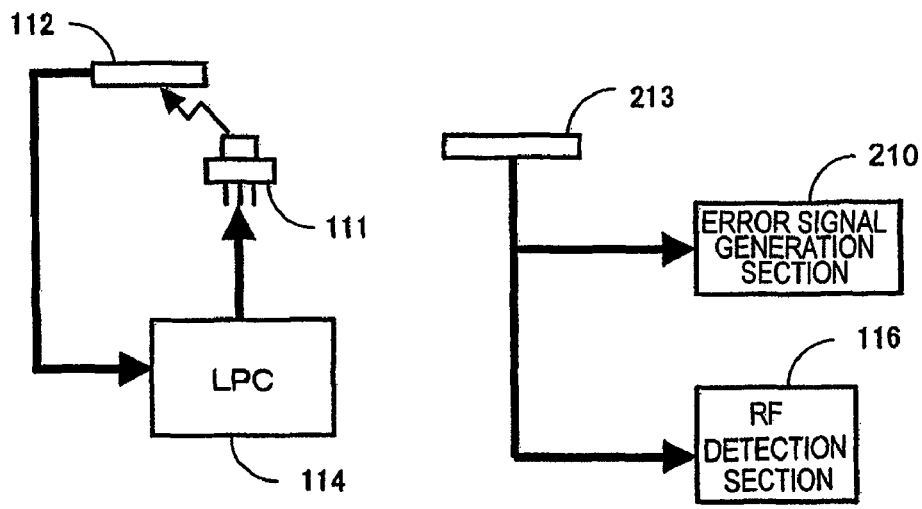

FIGS. 2(a) and (b) show the outline of a construction for processing detection signals which are output from the photodetectors 112 and 113. As shown in FIGS. 2(a) and (b), the optical disk apparatus includes a laser power controller (LPC) 114, an error signal generation section 210, a servo control section 217, and an RF signal detection section 116.

As described above, the photodetector 112 detects a portion of the light emitted from the laser 111, and outputs a detection signal to the laser power controller 114. Based on the detection signal, the laser power controller 114 controls the power of the laser 111. The signal obtained from the photodetector 112 is also referred to as a frontlight signal.

The photodetector 213 receives the reflected light from the optical disk 101, and the signal which has been generated through detection is input to the error signal generation section 210 and the RF signal detection section 116.

As will be specifically described below, the error signal generation section 210 generates a position error signal based on the detection signals which are output from the photodetector 213. The position error signal includes a tracking error signal and a focus error signal. Based on the position error signal, the servo control section 217 adjusts the position of the objective lens 105, thereby performing focus control and tracking control so that the light beam will follow along a track on the optical disk 101 in a predetermined convergence state. From the detection signals, the RF detection section 116 extracts information that is stored on the optical disk 101, e.g., user data, as well as address information.

Figure 3:
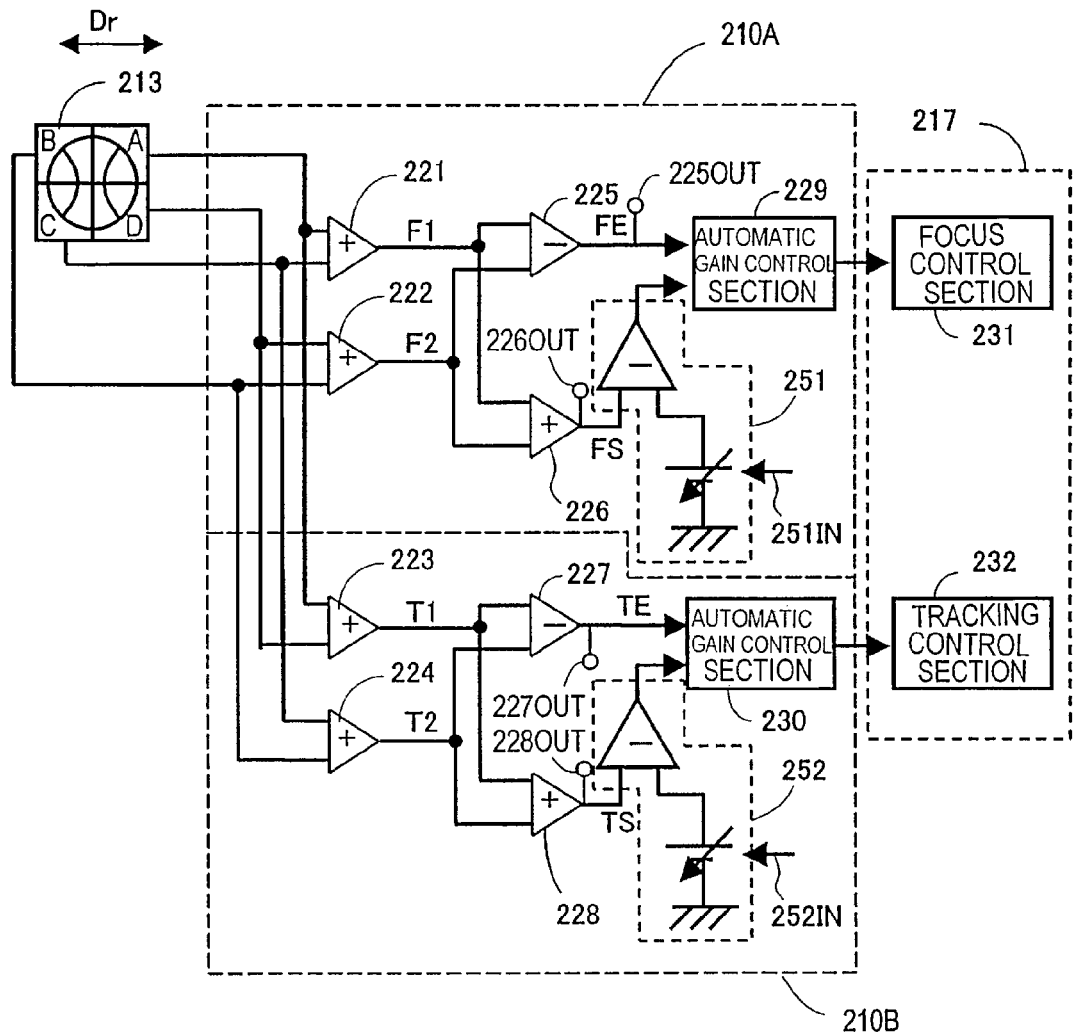
FIG. 3 A block diagram showing the construction of an error signal generation section of the apparatus shown in FIG. 1.

Next, with reference to FIG. 3, the structure of the error signal generation section 210 will be specifically described. As shown in FIG. 3, the error signal generation section 210 includes an error signal generation section 210A for generating a focus error signal based on the detection signals obtained from the photodetector 213, and an error signal generation section 210B for generating a tracking error signal. Moreover, the servo control section 217 includes a focus control section 231 and a tracking control section 232.

The photodetector 213 includes at least two detection sections, and independently output detection signals which are in accordance with the intensity or light amount of the light which is radiated on the respective detection sections. In the present embodiment, as shown in FIG. 3, the light-receiving surface of the photodetector 213 is divided into four areas at boundaries which are parallel to the radial direction Dr of the optical disk 101 and a direction generally orthogonal to the radial direction Dr. Thus, the photodetector 213 includes detection sections A to D. Moreover, in the present embodiment, a focus error signal and a tracking error signal are generated by astigmatic aberration technique and push-pull technique. Therefore, the error signal generation section 210A for generating a focus error signal includes adders 221 and 222, such that the adder 221 adds the detection signals that are obtained from the detection section A and the detection section C to provide a signal F1. Moreover, the adder 222 adds the detection signals that are obtained from the detection section B and the detection section D to provide a signal F2.

Similarly, the error signal generation section 210B for generating a tracking error signal includes adders 223 and 224, such that the adder 223 adds the detection signals that are obtained from the detection section A and the detection section D to provide a signal T1. Moreover, the adder 224 adds the detection signals that are obtained from the detection section B and the detection section C to provide a signal T2. The adders 221 to 224 may be provided within the optical pickup 160 so as to be near the photodetector 213.

Although the photodetector 213 is used in common for the generation of a focus error signal and for the generation of a tracking error signal in the present embodiment, two photodetectors may be provided respectively for the generation of a focus error signal and for the generation of a tracking error signal. In this case, without employing the adders 221 to 224, each detection signal may be taken out from one region comprising the aforementioned combination of detection sections. In other words, the signals F1, F2, T1, and T2 may be directly taken out from the detection sections of the detectors.

Figure 4:
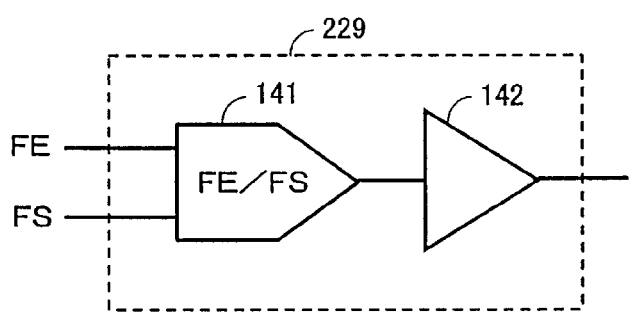
FIG. 4 A block diagram showing the construction of an automatic gain control section.

The error signal generation section 210A further includes a subtracter 225, an adder 226, an offset adjustment section 251, and an automatic gain control section 229. Moreover, the automatic gain control section 229 includes a divider 141 and an amplifier 142, as shown in FIG. 4.

The subtracter 225 and the adder 226 generate a difference signal and a sum signal, respectively, of the signals F1 and F2. The difference signal which is output from the subtracter 225 represents how much the objective lens is misaligned from a reference position along the focus direction, and serves as a focus error signal (FE signal). The sum signal which is output from the adder 226 is a sum total of the signals that are detected in the detection sections A to D of the photodetector 213, and serves as a focus sum signal (FS signal).

The offset adjustment section 251 adjusts an offset in the focus sum signal. In the automatic gain control section 229, the divider 141 receives a focus error signal and a focus sum signal whose offset has been adjusted, and divides the focus error signal by the focus sum signal. The amplifier 142 amplifies the output signal of the divider 141 by a predetermined gain.

The error signal generation section 210B has a similar structure to that of the error signal generation section 210A. Specifically, the error signal generation section 210B further includes a subtracter 227, an adder 228, an offset adjustment section 252, and an automatic gain control section 230. Although not shown, the automatic gain control section 230 also includes a divider and an amplifier.

The subtracter 227 and the adder 228 generate a difference signal and a sum signal, respectively, of the signals T1 and T2. The difference signal which is output from the subtracter 228 represents how much the objective lens is misaligned from a reference position of a track along the radial direction of the optical disk 101, and serves as a tracking error signal (TE signal). The sum signal which is output from the adder 228 is a sum total of the signals that are detected in the detection sections A to D of the photodetector 213, and serves as a tracking sum signal (FS signal).

The offset adjustment section 252 adjusts an offset in the tracking sum signal. In the automatic gain control section, a divider receives a tracking error signal and a tracking sum signal whose offset has been adjusted, and divides the tracking error by the tracking sum signal. An amplifier amplifies the output signal of the divider 141 by a predetermined gain.

In the error signal generation sections 210A and 210B, offset components that are superposed on the focus sum signal and tracking sum signal, which are ascribable to stray light from the optical disk, are adjusted by the offset adjustment sections 251 and 252, respectively. As a result, the focus error signal and tracking error signal which are output from the automatic gain control sections 229 and 230 will always have constant amplitudes.

The focus error signal and tracking error signal with stable sizes of amplitude are input to the focus control section 231 and the tracking control section 232, respectively. Based on the focus error signal and tracking error signal, the focus control section 231 and the tracking control section 232 generate a focus control signal and a tracking control signal. The focus control signal and tracking control signal are input to a driving section (not shown), whereby a driving signal for driving the objective lens is generated. As the driving signal is applied to the actuator 106, the position of the objective lens is controlled along the tracking direction and the focus direction in accordance with the focus control signal and tracking control signal.

Figure 5:
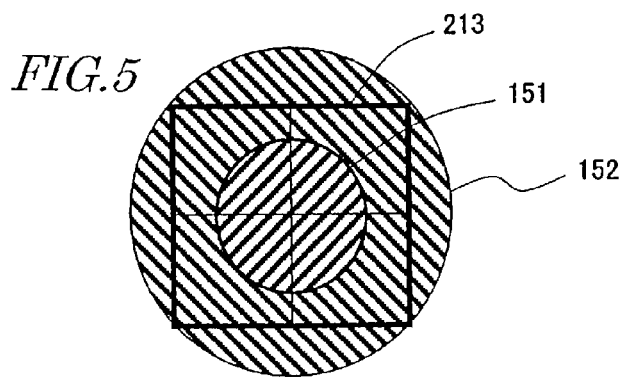
FIG. 5 A diagram for explaining a relationship between reflected light from a recording surface, which enters a photodetector, and stray light from an optical disk.

Hereinafter, the operation of the error signal generation sections 210A and 210B will be specifically described. FIG. 5 schematically shows light entering the photodetector 213 in the optical disk apparatus of the present embodiment. As shown in FIG. 5, reflected light 151 of the light which is converged toward a track on the optical disk enters the photodetector 213. The photodetector 213 is also entered by stray light 152, such as light occurring due to birefringence of the substrate of the optical disk 101, and, in the case where the optical disk 101 includes a plurality of recording layers, reflected light occurring in those layers in which recording or reproduction is not even taking place. The present embodiment is able to stabilize the amplitudes of lens position error signals such as a tracking error signal or a focus error signal, particularly effectively in the case where the center of the reflected light coincides with the center of the stray light and the reflected light and the stray light are uniformly entering the photodetector 113, as shown in FIG. 5.

Figure 6:
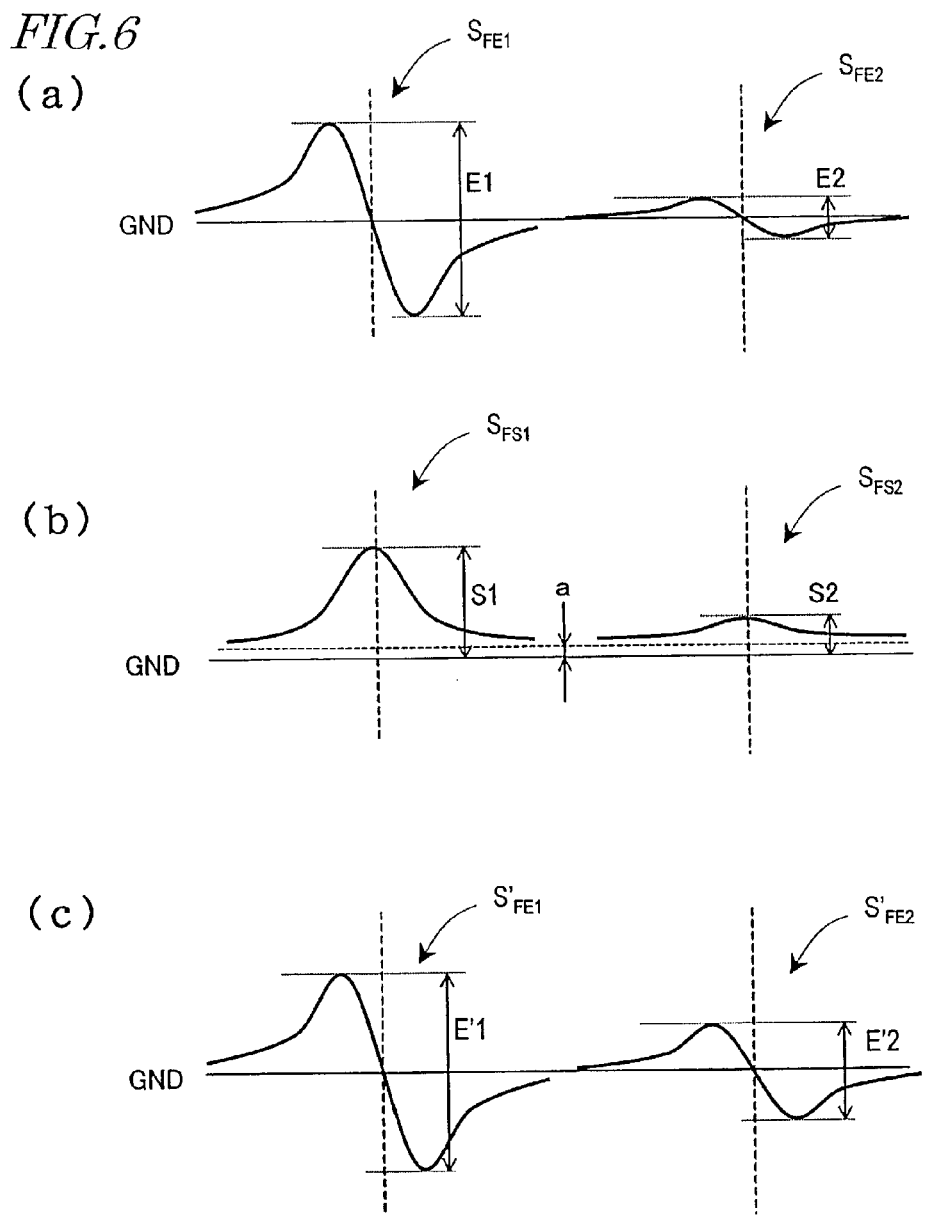
FIGS. 6 (a), (b), and (c) are diagrams showing focus error signals, focus sum signals, and focus error signals via automatic gain control, where the amount of reflected light from the recording surface of an optical disk varies in the first embodiment.

FIGS. 6(a) and (b) show focus error signals ($S_{FE1}$, $S_{FE2}$) and focus sum signals ($S_{FS1}$, $S_{FS2}$) which are obtained when the objective lens is driven by the actuator 106 so that the distance between the objective lens 105 and the optical disk 101 is changed. In the respective figures, the left-side waveforms $S_{FE1}$ and $S_{FS1}$ represent the case where the light amount of the reflected light 151 is greater than the light amount of the stray light 152, whereas the right-side waveforms $S_{FE2}$ and $S_{FS2}$ represent the case where the light amount of the reflected light 151 is smaller than the light amount of the stray light 152.

As shown in FIG. 6(a), irrespective of the proportion between the light amount of the reflected light 151 and the light amount of the stray light 152, the waveforms ($S_{FE1}$, $S_{FE2}$) of the focus error signal are symmetric with respect to the reference potential (GND), and there is no offset due to the stray light 152. This is because the focus error signal uniformly enters the detector 113, and the focus error signal is derived from a difference between the signals obtained from the detection sections A and C of the photodetector 113 and the signals obtained from the detection sections B and D, so that the influences of stray light are canceled.

On the other hand, as shown in FIG. 6(b), a constant offset voltage a is superposed on each of the waveforms ($S_{FS1}$, $S_{FS2}$) of the focus sum signal, irrespective of the proportion between the light amount of the reflected light 151 and the light amount of the stray light 152, due to the influences of stray light. Thus, the offset due to stray light is a direct current (DC) component.

FIG. 6(c) shows results of dividing the focus error signal by the focus sum signal, in the case where the light amount of the reflected light 151 is greater (left side) and smaller (right side) than the light amount of the stray light 152.

As is clear from FIG. 6(c), the size of amplitude is different between the waveform $S'_{FE1}$ and the waveform $S'_{FE2}$. This is because, since the offset voltage a due to stray light is superposed on the focus sum signal, the size of amplitude of the focus sum signal is no longer in proportion with the overall light amount of the reflected light 151. As a result, the result of dividing the focus error signal by the focus sum signal, i.e., the focus error signal obtained from the automatic gain control section, no longer has a constant amplitude. In FIG. 6(c), the amplitude of the focus error signal obtained from the automatic gain control section becomes smaller when the light amount of the reflected light 151 is smaller than the light amount of the stray light 152.

Figure 7:
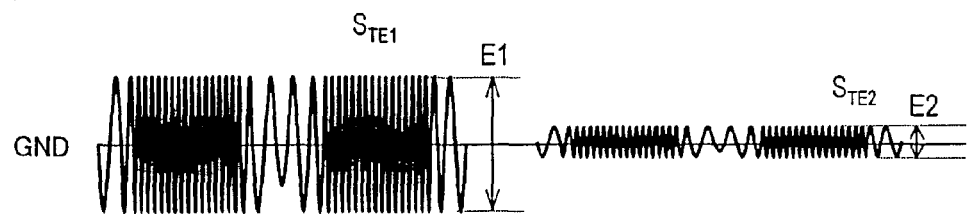
FIGS. 7 (a), (b), and (c) are diagrams showing tracking error signals, tracking sum signals, and tracking error signals via automatic gain control, where the amount of reflected light from the recording surface of an optical disk varies in the first embodiment.
Figure 7:
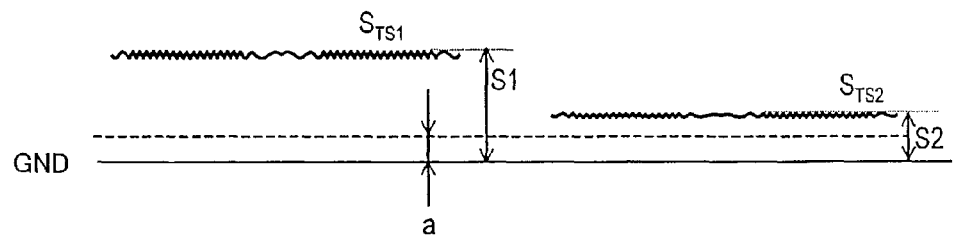
Figure 7:
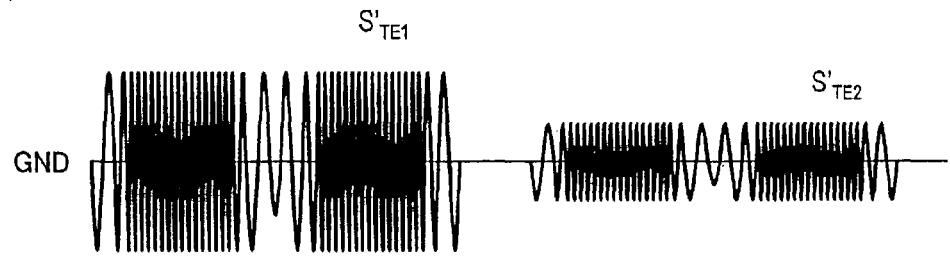

FIGS. 7(a), (b), and (c) show tracking error signals and tracking sum signals ($S_{TE1}$, $S_{TE2}$) and focus sum signals ($S_{TS1}$, $S_{TS2}$) which are obtained by moving the optical pickup 160 along the radial direction of the optical disk 101 without performing focus control. In the figures, the left-side waveforms $S_{TE1}$ and $S_{TS1}$ represent the case where the light amount of the reflected light 151 is greater than the light amount of the stray light 152, whereas the right-side waveforms $S_{TE2}$ and $S_{TS2}$ represent the case where the light amount of the reflected light 151 is smaller than the light amount of the stray light 152.

As in the case of the focus error signal and focus sum signal, the waveforms ($S_{TE1}$, $S_{TE2}$) of the tracking error signal are symmetric with respect to the reference potential (GND), and there is no offset due to the stray light 152. This is because influences of stray light are canceled. Moreover, a constant offset voltage a is superposed on each of the waveforms ($S_{TS1}$, $S_{TS2}$) of the tracking sum signal, due to the influences of stray light.

FIG. 7(c) shows results of dividing the tracking error signal by the tracking sum signal, in the case where the light amount of the reflected light 151 is greater (left side) and smaller (right side) than the light amount of the stray light 152. As in the case of the focus error signal, the result of dividing the tracking error signal by the tracking sum signal, i.e., the tracking error signal obtained from the automatic gain control section, no longer has a constant amplitude. In FIG. 7(c), the amplitude of the tracking error signal obtained from the automatic gain control section becomes smaller when the light amount of the reflected light 151 is smaller than the light amount of the stray light 152.

In the present embodiment, the offset adjustment sections 251 and 252 are provided in the error signal generation sections 210A and 210B, and the offsets due to stray light which are present in the focus sum signal and tracking sum signal are canceled in the offset adjustment sections 251 and 252. For example, the offset adjustment sections 251 and 252 may be composed of subtracters, and a voltage corresponding to the offset a shown in FIG. 6(b) and FIG. 7(b) may be subtracted from the focus sum signal and tracking sum signal in the offset adjustment sections 251 and 252, respectively.

As a result, a focus sum signal and a tracking sum signal whose offsets have been adjusted are obtained from the offset adjustment sections 251 and 252. By dividing the focus error signal and tracking error signal by the focus sum signal and tracking sum signal whose offsets have been adjusted in the automatic gain control sections 229 and 230, respectively, a focus error signal and a tracking error signal with constant and stable amplitudes can be obtained.

The offset a to be input to the offset adjustment sections 251 and 252 is derived by the following method.

As shown in FIG. 6(a), it is assumed that the focus error signal may have amplitudes E1 and E2. As shown in FIG. 6(b), it is assumed that the focus sum signal may have amplitudes S1, S2, and that an offset a exists in the focus sum signal due to stray light from the optical disk 101.

In the case where a focus sum signal whose offset has been adjusted is used, the value obtained by dividing the focus error signal by the focus sum signal whose offset has been adjusted is constant. Therefore, eq. (1) below holds true.

$$E1/(S1-a)=E2/(S2-a) \qquad \text{eq. (1)}$$

Resolving eq. (1) with respect to a gives eq. (2).

$$a=(E1 \times S2 - E2 \times S1)/(E1-E2) \qquad \text{eq. (2)}$$

As shown in FIG. 7(a), it is assumed that the tracking error signal may have amplitudes E1 and E2. As shown in FIG. 7(b), it is assumed that the tracking sum signal may have amplitudes S1, S2, and that an offset a exists in the focus sum signal due to stray light from the optical disk 101. In this case, the relationship of eq. (1) is also satisfied with respect to the tracking error signal and the tracking sum signal whose offset has been adjusted. Therefore, the offset a which is superposed on the tracking sum signal can also be determined from eq. (2).

Thus, by acquiring the focus error signal and focus sum signal and the tracking error signal and tracking sum signal at no less than two different points on the optical disk 101 and determining their respective sizes of amplitude, the values of the offset a can be ascertained from eq. (2).

By setting the ascertained a's to the offset adjustment sections 251 and 252, a focus sum signal and a tracking sum signal whose offsets a have been adjusted are obtained from the offset adjustment sections 251 and 252, so that a focus error signal and a tracking error signal that have constant amplitudes even in the presence of stray light can be obtained from the automatic gain sections 229 and 230.

In order to measure the amplitudes of the focus error signal and focus sum signal and the tracking error signal and tracking sum signal, outputs of the subtracter 225, the adder 226, the subtracter 227, and the adder 228 are acquired at terminals 225OUT, 226OUT, 227OUT, and 228OUT, as shown in FIG. 3 for example. Alternatively, in the offset adjustment sections 251 and 252, a reference potential (GND) may be applied at terminals 251IN and 252IN, and a focus error signal, a focus sum signal, a tracking error signal, and a tracking sum signal that are input to the automatic gain control sections 229 and 230 may used instead. In order to be compared against the reference potential, the focus sum signal and tracking sum signal which are output from the offset adjustment sections 251 and 252 are yet to have their offsets adjusted. Alternatively, the focus error signal and tracking error signal which are output from the automatic gain control sections 229 and 230 under such conditions may also be used.

By converting the signals thus obtained to digital signals with e.g., A/D converters; using the controller 171 to determine the amplitudes E1, E2, S1, and S2; and performing the calculation of eq. (2), the offsets a can be ascertained. By converting the ascertained offsets a to analog signals with D/A converters, and applying the ascertained offsets a to the terminals 251IN and 252IN, a focus sum signal and a tracking sum signal whose offsets a have been adjusted can be obtained from the offset adjustment sections 251 and 252.

Figure 8:
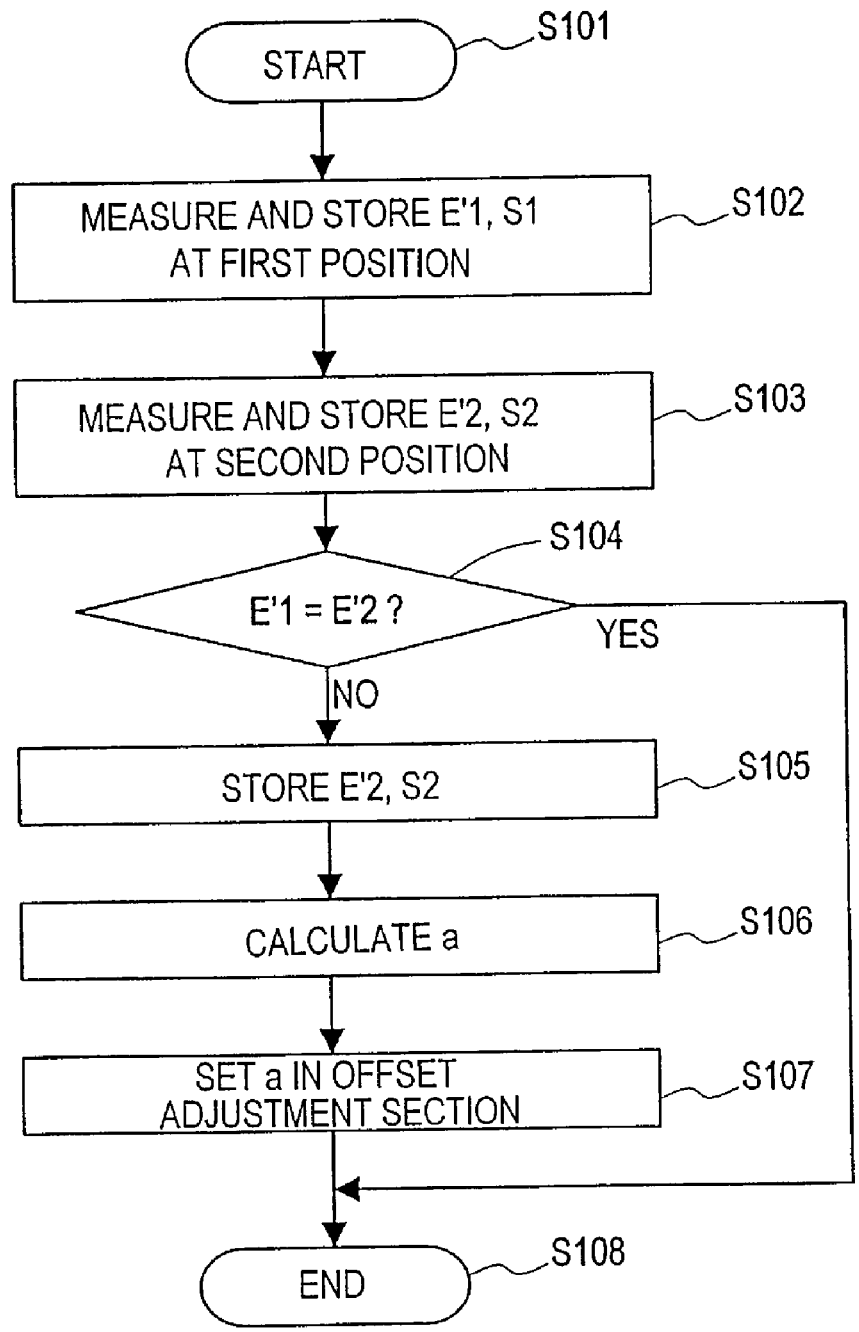
FIG. 8 A flowchart showing a control method for the optical disk apparatus according to the first embodiment.

Next, an exemplary control method for the optical disk apparatus of the present embodiment will be described with reference to the flowcharts shown in FIG. 1, FIG. 3, and FIG. 8. The control method for the optical disk apparatus described below is to be stored in an information storage medium or the like, e.g., an EEPROM or RAM, in the form of a computer-readable program (firmware) for executing the procedures of the control method. The computer and the information storage medium may be the controller 171 and the memory 172, or may be separately provided in the optical disk apparatus of the present embodiment.

When the optical disk 101 is mounted in the optical disk apparatus, control is begun (step S101). The controller 171 drives the feed motor 161 so that a light beam which is emitted from the optical pickup 160 is radiated at a first position on the optical disk 101. While the actuator 106 is driven to move the position of the objective lens 105 along the focus direction, a light beam is radiated toward the optical disk 101, at the first position. Reflected light and stray light are detected by using the photodetector 213, and an amplitude E'1 of a focus error signal or tracking error signal output from the automatic gain control section 329 or 330 and an amplitude S1 of the focus sum signal are ascertained. The ascertained amplitude E'1 and S1 are stored to the memory 172 (step S102). Note that, at this time, a reference potential (GND) is being applied to the terminals 251IN and 252IN so that there are zero offsets in the offset adjustment sections 251 and 252.

Next, the feed motor 161 is driven so that a light beam which is emitted from the optical pickup 160 is radiated at a second position on the optical disk 101. While the actuator 106 is driven to move the position of the objective lens 105 along the focus direction, a light beam is radiated toward the optical disk 101, at the second position. Reflected light and stray light are detected by using the photodetector 213, and an amplitude E'2 of a focus error signal or tracking error signal output from the automatic gain control section 329 or 330 and an amplitude S2 of the focus sum signal or tracking sum signal are ascertained. (step S103).

Next, the amplitudes E'1 and E'2 are compared (step S104). If the amplitudes E11 and E'2 are equal or the difference between the amplitudes E'1 and E'2 is equal to or less than a predetermined value, the influence of the offset due to stray light is small, and the amplitudes of the focus error signal or tracking error signal at the two measured points are substantially equal. Therefore, it is unnecessary to correct the offset, and the process is ended (step S108).

If the amplitudes E'1 and E'2 are different, and the difference therebetween is greater than the predetermined value, there is an influence of an offset due to stray light, such that the offset needs to be canceled. Therefore, the amplitudes E'2 and S2 at the second position are stored (step S105), and from the stored E'1, E'2, S1, and S2, an offset a in the focus sum signal or tracking sum signal is determined according to eq. (2) (step S106). Note that the amplitudes E'1 and E'2 satisfy the relationships E'1=E1/S1 and E'2=E2/S. By using these relationships, it is possible to conduct the calculations without using E1 and E2.

Thereafter, the calculated offsets a are set to the terminals 251IN and 252IN (step S107). The offsets a which have been thus set are subtracted, respectively, from the focus sum signal and tracking sum signal in the offset adjustment sections 251 and 252, whereby the offsets are canceled. Therefore, the focus error signal and tracking error signal which are output from the automatic gain control sections 229 and 230 will always have constant amplitudes. As a result, the stability of the focus control and tracking control is enhanced, and the likelihood of the control becoming unstable due to external factors is reduced.

Although in the present embodiment the offset a is determined from the amplitude of the focus error signal or tracking error signal measured at the first and second positions, there may be three measured positions. In this case, if it is presumable that the light amount of stray light is the same at any position on the optical disk 101 and that the offset a is constant, a plurality of offsets a may be ascertained by using measurement values taken at two arbitrary positions that are selected from among a plurality of measured positions, and the ascertained offsets a may be averaged. By taking measurements at the plurality of measured positions, a more accurate offset a can be obtained.

In the case where the offset a varies within the optical disk 101 since the light amount of stray light varies with position on the optical disk 101, the aforementioned first and second positions are preferably set within a region in which the offset a can be regarded as constant. By setting a plurality of such regions in the optical disk 101, and setting the first and second positions in each region to ascertain the offset a, it becomes possible to properly cancel the influence of the offset a even if the amount of birefringence differs depending on the radial position on the optical disk 101, whereby a focus error signal and a tracking error signal having constant amplitudes can be generated.

Second Embodiment

Figure 9:
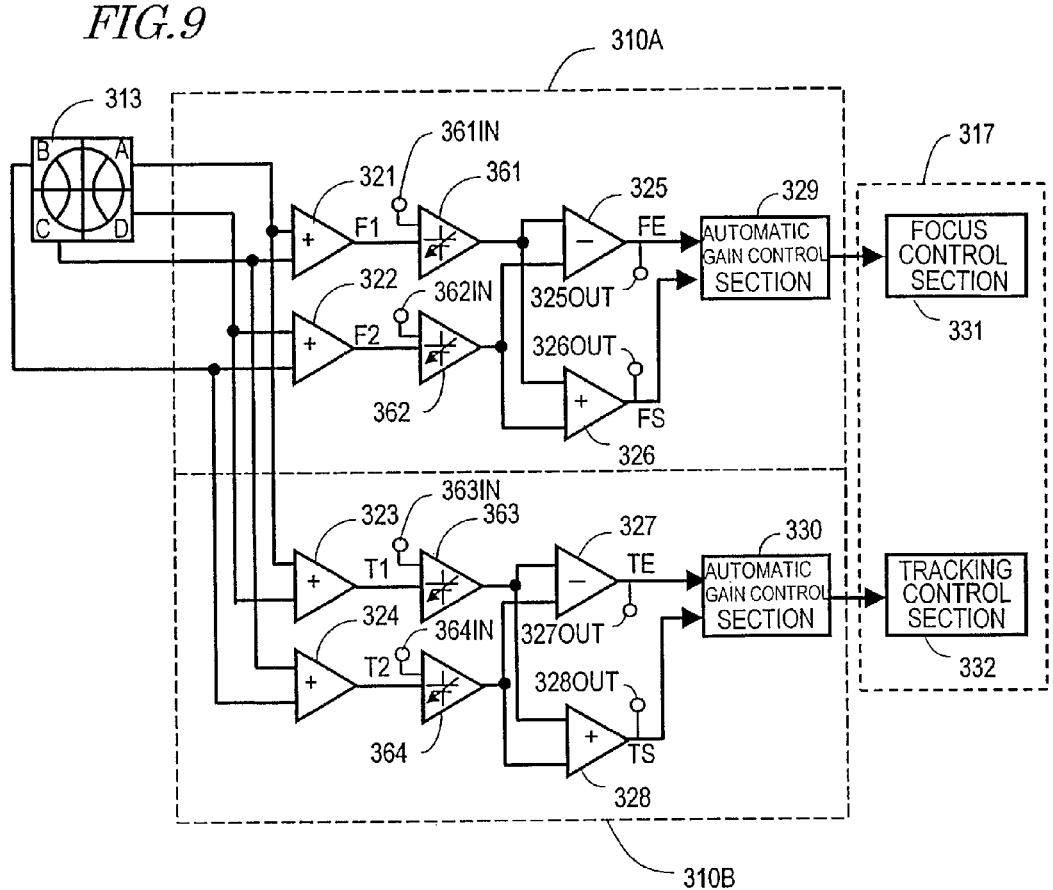
FIG. 9 A block diagram showing the construction of an error signal generation section according to a second embodiment.

Hereinafter, a second embodiment of the optical disk apparatus according to the present invention will be described. FIG. 9 is a block diagram showing the construction of error signal generation sections 310A and 310B in the optical disk apparatus of the second embodiment. A photodetector 313 shown in FIG. 9 has the same structure as that of the photodetector 212 of the first embodiment. A servo control section 317 includes a focus control section 331 and a tracking control section 332, and has a function similar to that of the servo control section 217 of the first embodiment.

The error signal generation sections 310A and 310B include adders 321, 322, 323, and 324. As in the first embodiment, the adder 321 adds detection signals that are obtained from the detection section A and the detection section C to provide a signal F1. The adder 322 adds detection signals that are obtained from the detection section B and the detection section D to provide a signal F2. The adder 323 adds detection signals that are obtained from the detection section A and the detection section D to provide a signal T1. The adder 324 adds detection signals that are obtained from the detection section B and the detection section C to provide a signal T2.

As will be specifically described below, the present embodiment is suitably used in the case where stray light enters the photodetector 313 in a non-uniform manner. Since the stray light enters the photodetector 313 in a non-uniform manner, even if a difference between the signal F1 and the signal F2 or a difference between the signals T1 and T2 is ascertained, the offsets due to stray light will not be canceled in these difference signals.

Therefore, the error signal generation sections 310A and 310B have offset adjustment sections 361, 362, 363, and 364 for adjusting the offsets that are superposed on the signals F1, F2, T1, and T2. For example, the offset adjustment sections 361, 362, 363, and 364 are subtracters respectively having terminals 361IN, 362IN, 363IN, and 364IN at which offsets are to be applied.

The offset adjustment sections 361, 362, 363, and 364 respectively receive outputs from the adders 321, 322, 323, and 324, and output signals F1, F2, T1, and T2 whose offsets have been adjusted. The signals F1 and F2 are subjected to calculations by the subtracter 325 and the adder 326, whereby a focus error (FE) signal and a focus sum (FS) signal are generated. Moreover, the signals T1 and T2 are subjected to calculations by the subtracter 327 and the adder 328, whereby a tracking error (TE) signal and a tracking sum (FS) signal are generated. As in the first embodiment, these signals are input to the automatic gain control sections 329 and 330.

Figure 10:
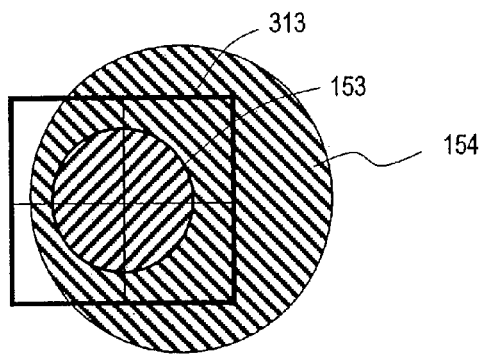
FIG. 10 A diagram for explaining a relationship between reflected light from a recording surface, which enters a photodetector, and stray light from an optical disk.

FIG. 10 schematically shows light entering the photodetector 313 in the optical disk apparatus of the present embodiment. As shown in FIG. 10, reflected light 153 of the light which is converged toward a track on the optical disk enters the photodetector 313. The photodetector 313 is also entered by stray light 154, such as light occurring due to birefringence of the substrate of the optical disk 101, and, in the case where the optical disk 101 includes a plurality of recording layers, reflected light occurring in those layers in which recording or reproduction is not even taking place. In the present embodiment, as shown in FIG. 10, the reflected light uniformly enters the photodetector 313, but the stray light 154 enters the photodetector 113 in a non-uniform manner. The present embodiment is able to stabilize the amplitudes of lens position error signals such as a tracking error signal and a focus error signal, particularly effectively in such cases.

Figure 11:
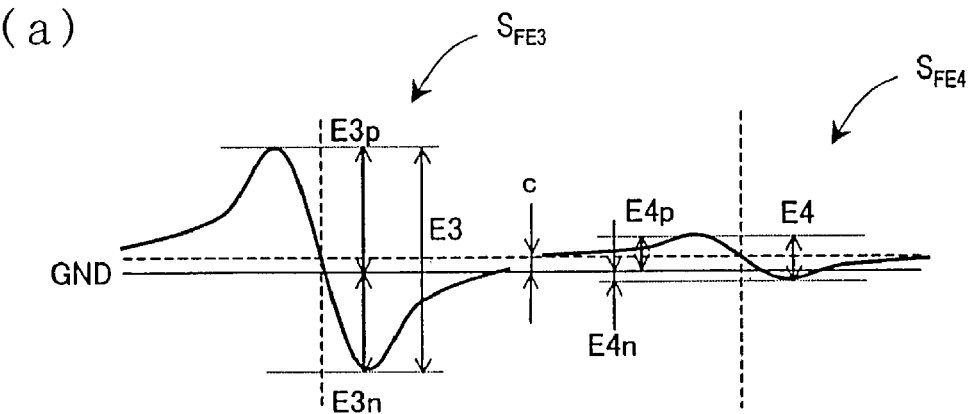
FIGS. 11 (a), (b), and (c) are diagrams showing focus error signals, focus sum signals, and focus error signals via automatic gain control, where the amount of reflected light from the recording surface of an optical disk varies in the second embodiment.
Figure 11:
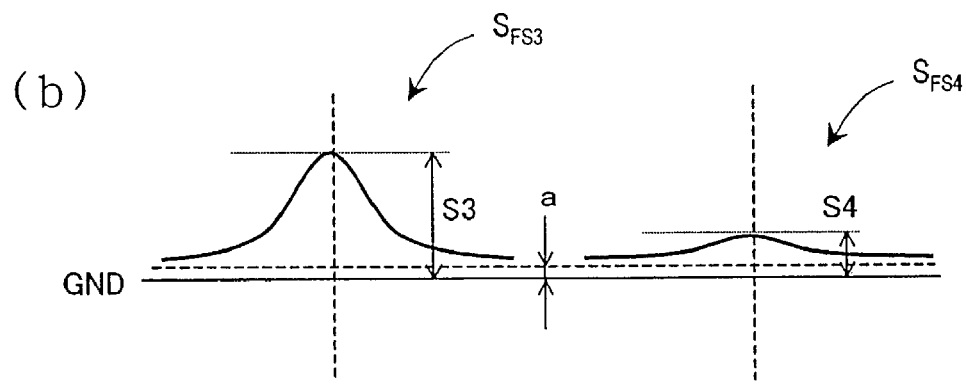
Figure 11:
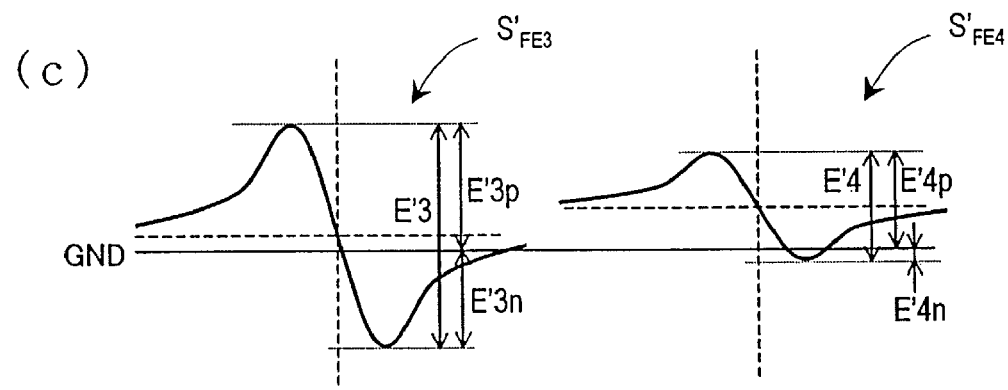

FIGS. 11(a) and (b) show focus error signals ($S_{FE3}$, $S_{FE3}$) and focus sum signals ($S_{FS3}$, $S_{FS3}$) which are obtained when the objective lens is driven by the actuator 106 so that the distance between the objective lens 105 and the optical disk 101 is changed. In the respective figures, the left-side waveforms $S_{FE3}$ and $S_{FS3}$ represent the case where the light amount of the reflected light 153 is greater than the light amount of the stray light 154, whereas the right-side waveforms $S_{FE3}$ and $S_{FS3}$ represent the case where the light amount of the reflected light 153 is smaller than the light amount of the stray light 154.

As shown in FIG. 11(a), irrespective of the proportion between the light amount of the reflected light 153 and the light amount of the stray light 154, the waveforms ($S_{FE3}$, $S_{FE3}$) of the focus error signal have an offset c superposed thereon, with respect to the reference potential (GND). This is because, as mentioned above, the stray light enters the photodetector 313 in a non-uniform manner, and thus the stray light will not be canceled even by ascertaining difference signals.

Similarly, as shown in FIG. 11(b), irrespective of the proportion between the light amount of the reflected light 153 and the light amount of the stray light 154, the waveforms ($S_{FS3}$, $S_{FS3}$) of the focus sum signal have a constant offset voltage a superposed on each waveform, due to the influences of stray light.

FIG. 11(c) shows results of dividing the focus error signal by the focus sum signal, in the case where the light amount of the reflected light 153 is greater (left side) and smaller (right side) than the light amount of the stray light 154.

As is clear from FIG. 11(c), the size of amplitude is different between the waveform $S'_{FE3}$ and the waveform $S'_{FE3}$. In other words, the focus error signal obtained from the automatic gain control section no longer has a constant amplitude. In FIG. 11(c), the amplitude of the focus error signal obtained from the automatic gain control section becomes smaller when the light amount of the reflected light 151 is smaller than the light amount of the stray light 152.

Figure 12:
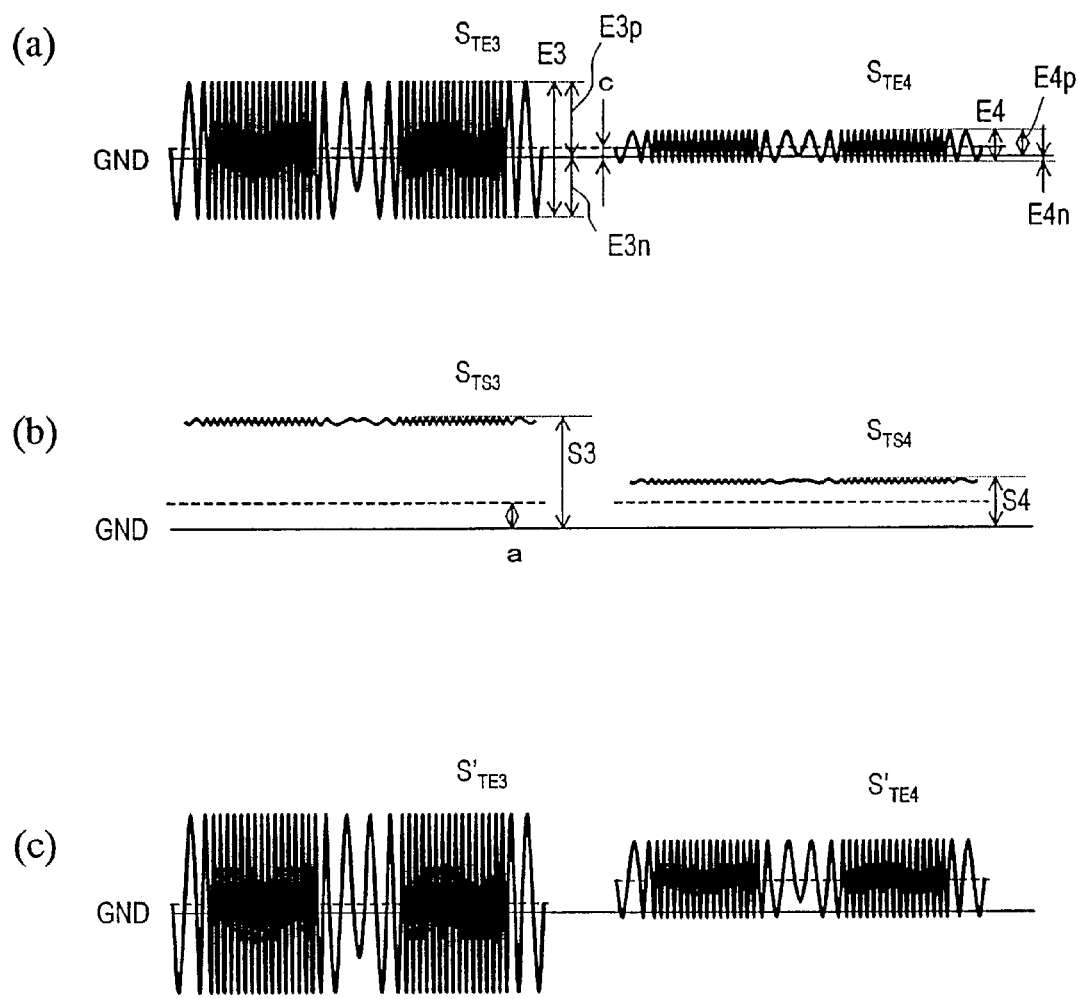
FIGS. 12 (a), (b), and (c) are diagrams showing tracking error signals, tracking sum signals, and tracking error signals via automatic gain control, where the amount of reflected light from the recording surface of an optical disk varies in the second embodiment.

FIGS. 12(a), (b), and (c) show tracking error signals and tracking sum signals ($S_{TE3}$, $S_{TE4}$) and focus sum signals ($S_{TS3}$, $S_{TS4}$) which are obtained by moving the optical pickup 160 along the radial direction of the optical disk 101 without performing focus control. In the figures, the left-side waveforms $S_{TE3}$ and $S_{TS3}$ represent the case where the light amount of the reflected light 153 is greater than the light amount of the stray light 152, whereas the right-side waveforms $S_{TE4}$ and $S_{TS4}$ represent the case where the light amount of the reflected light 151 is smaller than the light amount of the stray light 154.

As in the case of the focus error signal and focus sum signal, the waveforms ($S_{TE3}$, $S_{TE4}$) of the tracking error signal have an offset c superposed thereon, with respect to the reference potential (GND). Moreover, the waveforms ($S_{TS3}$, $S_{TS4}$) of the tracking sum signal each have a constant offset voltage a superposed thereon, due to the influences of stray light.

FIG. 12(c) shows results of dividing the tracking error signal by the tracking sum signal, in the case where the light amount of the reflected light 153 is greater (left side) and smaller (right side) than the light amount of the stray light 154. As in the case of the focus error signal, the result of dividing the tracking error signal by the tracking sum signal, i.e., the tracking error signal obtained from the automatic gain control section, no longer has a constant amplitude. In FIG. 12(c), the amplitude of the tracking error signal obtained from the automatic gain control section becomes smaller when the light amount of the reflected light 153 is smaller than the light amount of the stray light 154.

In the present embodiment, in order to cancel the offsets c that are superposed on the focus error signal and tracking error signal and the offsets a that are superposed on the focus sum signal and tracking sum signal, the offsets that are superposed on the signals F1, F2, T1, and T2 are canceled by the offset adjustment sections 361, 362, 363, and 364. Hereinafter, the settings in the offset adjustment sections 361, 362, 363, and 364 will be described.

As shown in FIG. 11(a), it is assumed that the focus error signal may have amplitudes E3, E4, the respective amplitudes having amplitude components E3$p$, E4$p$ on the +side and amplitude components E3$n$, E4$n$ on the −side of the reference potential (GND). It is also assumed that the focus sum signal may have amplitudes S3, S4. It is assumed that, due to stray light from the optical disk 101, offsets c, a, e, and f may occur in the focus error signal, the focus sum signal, the signal F1, and the signal F2, respectively.

Since the focus error signal is a difference between the signal F1 and the signal F2, and the focus sum signal is a sum of the signal F1 and the signal F2, the relationships of eqs. (3) (4) below hold true between the offsets.

$$a = e + f \quad \text{eq. (3)}$$

$$c = e - f \quad \text{eq. (4)}$$

In the case where a focus sum signal whose offset has been adjusted is used, the value obtained by dividing the focus error signal by the focus sum signal whose offset has been adjusted is constant. Therefore, similarly to eq. (2) above, the relationship of eq. (5) holds true.

$$a = (E3 \times S4 - E4 \times S3)/(E3 - E4) \quad \text{eq. (5)}$$

If the offset c occurring in the focus error signal is canceled, $S_{FE3}$ and $S_{FE4}$ will have symmetry, thus satisfying the relationship of eq. (6) below.

$$\{(E3p-c)-(E3n+c)\}/E3 = \{(E4p-c)-(E4n+c)\}/E4 \quad \text{eq. (6)}$$

Resolving eq. (6) with respect to c gives eq. (7) below.

$$c = \{E3 \times (E4p - E4n) - E4 \times (E3p - E3n)\}/\{2 \times (E3 - E4)\} \quad \text{eq. (7)}$$

The e and f that satisfy eqs. (4) (5) (7) are given by eqs. (8) (9) below.

$$e = \{E3 \times (2 \times S4 + E4p - E4n) - E4 \times (2 \times S3 + E3p - E3n)\}/\{4 \times (E3 - E4)\} \quad \text{eq. (8)}$$

$$f = \{E3 \times (2 \times S4 - E4p + E4n) - E4 \times (2 \times S3 - E3p + E3n)\}/\{4 \times (E3 - E4)\} \quad \text{eq. (9)}$$

Similarly, it is assumed that, as shown in FIGS. 12(a) and (b), the tracking error signal may have amplitudes E3, E4, the respective amplitudes having amplitude components E3$p$, E4$p$ on the +side and amplitude components E3$n$, E4$n$ on the −side of the reference potential (GND). It is also assumed that the tracking sum signal may have amplitudes S3, S4. It is assumed that, due to stray light from the optical disk 101, offsets c, a, e, and f may occur in the tracking error signal, the tracking sum signal, the signal T1, and the signal T2, respectively. In this case, offsets e and f can also be determined from eqs. (8) and (9).

Therefore, by acquiring the focus error signal and focus sum signal and the tracking error signal and tracking sum signal at no less than two different points on the optical disk 101 and determining their respective sizes of amplitude, the values of the offsets e, f can be ascertained from eq. (8) (9), respectively.

By setting the ascertained e's to the offset adjustment sections 361 and 363, and the ascertained f's to the offset adjustment sections 362 and 364, the offsets that are superposed on the signals F1, F2, T1, and T2 are canceled. As a result of this, the offsets in the focus error signal (as a difference signal) and the focus sum signal (as a sum signal) obtained from the signals F1 and F2 are adjusted. Moreover, the offsets in the tracking error signal (as a difference signal) and the tracking sum signal (as a sum signal) obtained from the signals T1 and T2 are adjusted. Therefore, a focus error signal and a tracking error signal that have constant amplitudes even in the presence of stray light can be obtained from the automatic gain sections 229 and 230.

In order to measure the amplitudes of the focus error signal and focus sum signal and the tracking error signal and tracking sum signal, outputs of the subtracter 325, the adder 326, the subtracter 327, and the adder 328 are acquired at terminals 325OUT, 326OUT, 327OUT, and 328OUT, as shown in FIG. 9 for example. Moreover, the offsets e, f are applied to the respective terminals 361IN, 362IN, 363IN, and 364IN of the offset adjustment sections.

Figure 13:
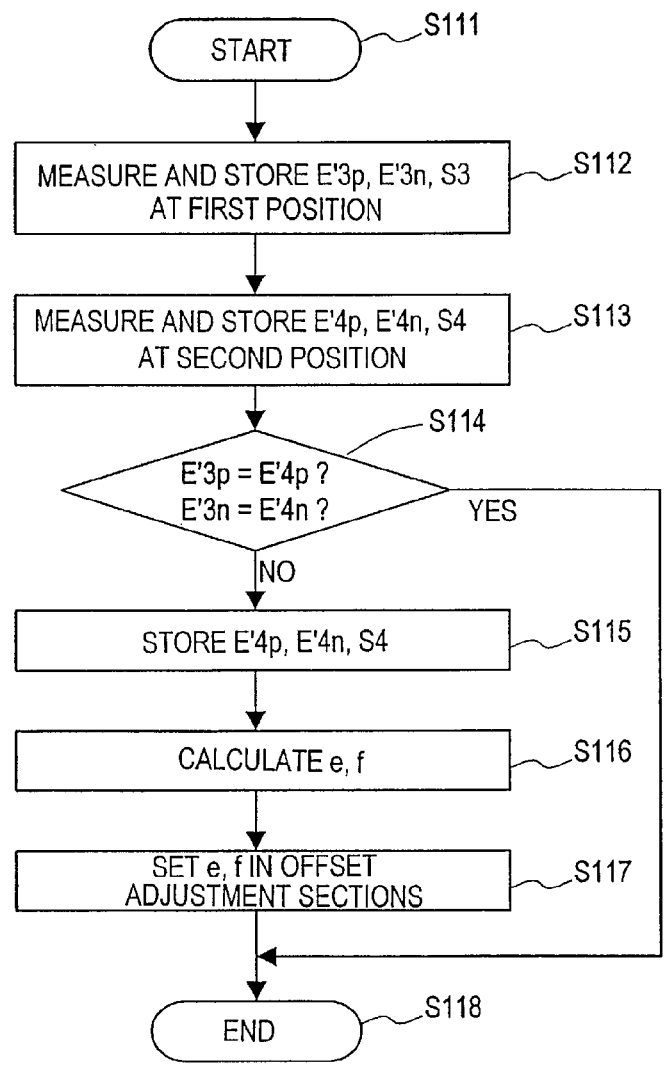
FIG. 13 A flowchart showing a control method for the optical disk apparatus according to the second embodiment.

Next, an exemplary control method for the optical disk apparatus of the present embodiment will be described with reference to the flowcharts shown in FIG. 1, FIG. 9, and FIG. 13. The following procedure is suitably used in the case where the optical disk 101 includes only one recording layer.

When the optical disk 101 is mounted in the optical disk apparatus, control is begun (step S121). The controller 171 drives the feed motor 161 so that a light beam which is emitted from the optical pickup 160 is radiated at a first position on the optical disk 101. While the actuator 106 is driven to move the position of the objective lens 105 along the focus direction, a light beam is radiated toward the optical disk 101, at the first position. Reflected light and stray light are detected by using the photodetector 313, and amplitudes E'3$p$, E'3$n$ of a focus error signal or tracking error signal output from the automatic gain control section 329 or 330 and an amplitude S3 of the focus sum signal are ascertained. The ascertained amplitudes E'3$p$, E'3$n$ and S1 are stored to the memory 172 (step S112). Note that, at this time, a reference potential (GND) is being applied to terminals 361IN to 364IN so that there are zero offsets in the offset adjustment sections 361, 362, 363, and 364.

Next, the feed motor 161 is driven so that a light beam which is emitted from the optical pickup 160 is radiated at a second position on the optical disk 101. While the actuator 106 is driven to move the position of the objective lens 105 along the focus direction, a light beam is radiated toward the optical disk 101, at the second position. Reflected light and stray light are detected by using the photodetector 213, and amplitudes E'3$p$, E'3$n$ of a focus error signal or tracking error signal output from the automatic gain control sections 329 and 330 and an amplitude S3 of the focus sum signal are ascertained (step S113).

Next, the amplitudes E'3$p$ and E'4$p$ are compared, and the amplitudes E'3$n$ and E'4$n$ are compared (step S114). If the amplitudes E'3$p$ and E'4$p$ and amplitudes E'3$n$ and E'4$n$ are equal, or the differences therebetween are equal to or less than a predetermined value, the influence of the offset due to stray light is small, and the amplitudes of the focus error signal or tracking error signal at the two measured points are substantially equal. Therefore, it is unnecessary to correct the offset, and the process is ended (step S118).

If the amplitudes E'3$p$ and E'4$p$ are different, or E'3$n$ and E'4$n$ are different, the difference being greater than the predetermined value, there is an influence of an offset due to stray light, such that the offset needs to be canceled. Therefore, the amplitudes E'4$p$, E'4$n$, and S4 at the second position are stored (step S115), and from the stored amplitudes E'3$p$, E'3$n$, S3 and amplitudes E'4$p$, E'4$n$, and S4, offsets e, f are determined according to eqs. (8) and (9) (step S116). Note that the amplitudes E'3p and E'3n satisfy the relationships E'3p=E3p/S3 and E'3n=E3n/S3. Moreover, E'4p and E'4n satisfy the relationships E'4p=E4p/S4 and E'4n=E4n/S4. Therefore, by using these relationships, it is possible to conduct the calculations of eqs. (8) and (9) without ascertaining E3p and the like.

Thereafter, the calculated offset e related to the focus error signal or tracking error signal is applied to the terminal 361IN or 363IN of the offset adjustment section. It is also set to the 364IN. Moreover, the offset f related to the focus error signal or tracking error signal is set to the terminal 362IN or 364IN of the offset adjustment section (step S117). With the offsets e and f being thus set, the offset adjustment sections 361 to 364 cancel the offsets that are superposed on the signals F1 and F2 and the offsets that are superposed on the signals T1 and T2. Therefore, the offsets in the focus error signal and focus sum signal obtained from the signals F1 and F2 are adjusted. Moreover, the offsets in the tracking error signal and tracking sum signal obtained from the signals T1 and T2 are adjusted.

Accordingly, the focus error signal and tracking error signal output from the automatic gain control sections 229 and 230 will always have constant amplitudes. As a result, the stability of the focus control and tracking control is enhanced, and the likelihood of the control becoming unstable due to external factors is reduced.

Figure 14:
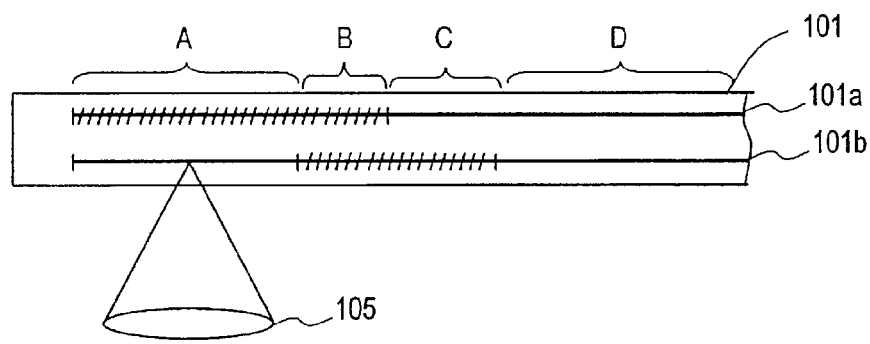
FIG. 14 A diagram for explaining areas where data is recorded in an optical disk having two recording layers.

Next, a control method for the optical disk apparatus of the present embodiment in the case where the optical disk 101 includes two recording layers will be described. FIG. 14 schematically shows a cross-sectional structure of the optical disk 101. The optical disk 101 includes a first recording layer 101a and a second recording layer 101b. In the first recording layer 101a and the second recording layer 101b, the hatched regions represent already-recorded data areas, and the non-hatched regions represent unrecorded areas where no data is recorded. Therefore, depending on whether data is recorded or not, the optical disk 101 is classified into four areas. Specifically, in area A, the first recording layer 101a is already-recorded, whereas the second recording layer 101b is unrecorded. In area B, the first recording layer 101a and the second recording layer 101b are both already-recorded. In area C, the first recording layer 101a is unrecorded, whereas the second recording layer 101b is already-recorded. In area D, the first recording layer 101a and the second recording layer 101b are both unrecorded.

Thus, in the case where the optical disk includes a plurality of recording layers, reflected light from other layers in which recording or reproduction is not even taking place may influence the offsets in the focus error signal, focus sum signal, etc., as stray light. Moreover, the reflectance of the recording layer differs between an area in which data is already recorded and an area in which data is unrecorded. Therefore, the size of the offset also changes depending on the status of recording. With the control method below, the influence of stray light can be appropriately suppressed and the stability of servo control can be enhanced, with respect to such an optical disk including a plurality of recording layers.

Note that, in the case where the optical disk includes a plurality of recording layers, peaks will be observed in the focus error signal and focus sum signal shown in FIGS. 11(a) and (b) according to the number of recording layers. For example, if the optical disk includes two recording layers, the focus error signal will contain two peaks and two valleys, and the focus sum signal will contain two peaks. However, when looking at the layer in which recording or reproduction is taking place, an optical disk including a plurality of recording layers can be treated similarly to an optical disk which includes only one recording layer.

Figure 15:
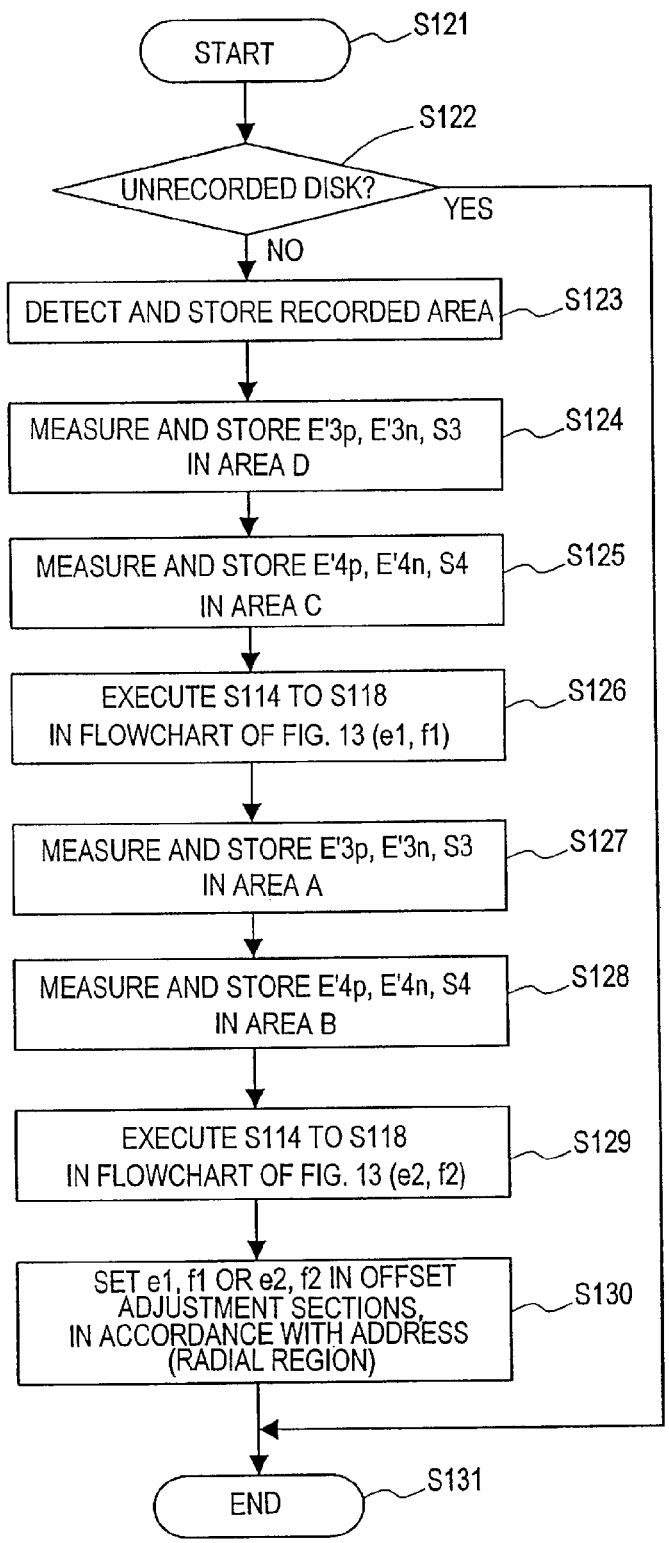
FIG. 15 A flowchart showing another control method for the optical disk apparatus according to the second embodiment.

Hereinafter, with reference to the flowchart shown in FIG. 15, a control method for the optical disk apparatus in the case where the optical disk 101 includes two recording layers will be described.

First, when an optical disk 101 is mounted to the optical disk apparatus, control is begun (step S121). The controller 171 allows a light beam to be emitted from the optical pickup 160, and determines whether the optical disk 101 is an unrecorded disk or not (step S122). The determination may be made by reading the data in an information management area which is provided at the innermost periphery of the optical disk 101, or a track in each recording layer of the optical disk 101 may be scanned to determine whether there is any data recorded. If the optical disk 101 is an unrecorded disk, it is considered that the stray light from other layers in which recording or reproduction is not taking place will not change, and therefore control is ended (step S131).

At this time, actual measurements of the amplitudes of the focus error signal and focus sum signal may be taken along the entire periphery, with respect to whether the light amount of the stray light changes with position on the optical disk or not. If the change in amplitude is equal to or less than a permissible value, control is ended (step S131). If the change in amplitude is greater than the permissible value, offsets may be detected at no less than two positions with different amplitudes, according to the procedure of the flowchart shown in FIG. 13.

In the case where the optical disk 101 is a recorded disk, it is detected as to which area has data recorded therein, and the information as to whether it is a recorded area or not is stored in association with an address or position along the radial direction of the optical disk 101 (step S213).

Next, as shown in FIG. 14, the controller 171 drives the feed motor 161 so that a light beam is radiated in area D, and moves the optical pickup 160. Then, in area D, amplitudes E'3p, E'3n, and S3 are measured, and stored to the memory 172 (step S124).

Next, the controller 171 drives the feed motor 161 so that a light beam is radiated in area C, and moves the optical pickup 160. Then, in area C, amplitudes E'4p, E'4n, and S4 are measured (step S125).

Then, steps S114 to S118 of the flowchart shown in FIG. 3 are carried out to calculate the offsets e1 and f1.

Thereafter, the controller 171 drives the feed motor 161 so that a light beam is radiated in area A, and moves the optical pickup 160. Then, in area A, amplitudes E'3p, E'3n, and S3 are measured, and stored to the memory 172 (step S124).

Next, the controller 171 drives the feed motor 161 so that a light beam is radiated in area B, and moves the optical pickup 160. Then, in area B, the amplitudes E'3p, E'3n, and S3 are measured, and stored to the memory 172 (step S124). Then, steps S114 to S118 of the flowchart shown in FIG. 13 are carried out to calculate the offsets e2 and f2.

Once the offsets e1, f1, e2, and f2 are thus ascertained, when performing recording or reproduction for the optical disk 101, the offsets e1 and f1 or the offsets e2 and f2 are selectively applied, in accordance with the areas A to D of the optical disk, to the terminals 361IN and 363IN of the offset adjustment sections, respectively (step S130). Specifically, when performing recording for the second recording layer 101b or reproducing data that is recorded in the second recording layer 101b while in areas C and D, the offsets in the signals F1, F2, T1, and T2 are adjusted by using the offsets e1 and f1. Moreover, when performing recording for the second recording layer 101b or reproducing data that is recorded in the second recording layer 101b while in areas A and B, the offsets in the signals F1, F2, T1, and T2 are adjusted by using the offsets e2 and f2.

By performing such control, in the case where the stray light from the layers in which recording or reproduction is not taking place does not change but there is changing reflectance in the layer in which recording or reproduction is taking place, offsets due to stray light can be appropriately canceled by detecting the light amount of stray light. As a result, the amplitudes of the focus error signal and tracking error signal after automatic gain control are kept constant, whereby the stability of servo control is enhanced.

Note that, when performing recording for the second recording layer 101b or reproducing the data that is recorded in the second recording layer 101b while near the boundary between area B and area C, the offsets in the signals F1, F2, T1, and T2 may be adjusted by using a value between the ascertained offsets e1 and e2 and a value between f1 and f2, e.g., respective average values.

Moreover, in the case where there is not much change in the amount of stray light depending on whether the first recording layer 101a is a recorded area or not, the offsets in the signals F1, F2, T1, and T2 may be adjusted by using an average value between e1 and e2 and an average value between f1 and f2.

Although the error signal generation sections are composed of electrical circuits in the first and second embodiments above, after the outputs from the respective detection sections of the photodetector are subjected to conversion by A/D converters, calculation processes similar to the functions of adders, subtracters, dividers, etc., may be executed by software.

Moreover, as has been described with respect to the first embodiment, measurements in the second embodiment may also be taken at three or more positions in order to reduce measurement errors.

Moreover, stray light components from an optical disk also change with warpage (tilt, skew) of the optical disk. Therefore, the optical disk apparatus of the present embodiment may comprise a detection section for detecting a tilt of an optical disk. In this case, a tilt mechanism for tilting the entire optical pickup or tilting the objective lens is preferably comprised in order to cancel the detected tilt. For example, in the case where the tilt changes with the radial position of the optical disk, providing a tilt mechanism will make it possible to perform a more accuracy automatic gain control in the optical disk apparatus according to the present invention.

INDUSTRIAL APPLICABILITY

The present invention can be suitably used in various optical disk apparatuses, and can be suitably used in optical disk apparatuses which support optical disks having a plurality of recording layers.

The invention claimed is:

1. An optical disk apparatus comprising:
 a rotation driving section on which an optical disk is to be mounted and which drives the optical disk so as to be rotated;
 a light source;
 an objective lens for converging light from the light source onto an optical disk mounted on the rotation driving section;
 a photodetector having at least two detection sections for detecting reflected light, from the optical disk, of the light; and
 an error signal generation section for deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens, wherein,
 the error signal generation section includes:
 a subtracter for deriving a difference between the signals respectively obtained from the two detection sections of the photodetector and outputting a difference signal;
 an adder for deriving a sum of the signals respectively output from the two detection sections of the photodetector and outputting a sum signal;
 an offset adjustment section for adjusting an offset in the sum signal; and
 a divider for dividing the difference signal by the sum signal whose offset has been adjusted, and
 the offset adjustment section adjusts the offset in the sum signal so that error signals obtained at no less than two different positions along a radial direction of the optical disk have an equal amplitude.

2. The optical disk apparatus of claim 1, wherein, from the sum signal a value a is adjusted that satisfies:

$$a = (E1 \times S2 - E2 \times S1)/(E1 - E2),$$

where E1 and S1 are amplitudes of the difference signal and the sum signal at a first position on the optical disk; and E2 and S2 are amplitudes of the difference signal and the sum signal at a second position on the optical disk.

3. An optical disk apparatus comprising:
 a rotation driving section on which an optical disk is to be mounted and which drives the optical disk so as to be rotated;
 a light source;
 an objective lens for converging light from the light source onto an optical disk mounted on the rotation driving section;
 a photodetector having at least two detection sections for detecting reflected light, from the optical disk, of the light; and
 an error signal generation section for deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens, wherein,
 the error signal generation section includes:
 first and second offset adjustment sections for adjusting offsets in the signals respectively obtained from the two detection sections of the photodetector;
 a subtracter for deriving a difference between the signals whose offsets have been adjusted, and outputting a difference signal;
 an adder for deriving a sum of the signals whose offsets have been adjusted, and outputting a sum signal; and
 a divider for dividing the difference signal by the sum signal, and
 from the signals obtained from the detection sections, the first and second offset adjustment sections adjust values e and f that satisfy:

$$e = \{E3 \times (2 \times S4 + E4p - E4n) - E4 \times (2 \times S3 + E3p - E3n)\}/\{4 \times (E3 - E4)\}$$

and $$f = \{E3 \times (2 \times S4 - E4p + E4n) - E4 \times (2 \times S3 - E3p + E3n)\}/\{4 \times (E3 - E4)\},$$

where E3 and S3 are amplitudes of the difference signal and the sum signal at a first position on the optical disk; E3$p$ and E3$n$ are positive and negative components of the amplitude E3 of the difference signal; E4 and S4 are amplitudes of the difference signal and the sum signal at a second position on the optical disk; and E4$p$ and E4$n$ are positive and negative components of the amplitude E4 of the difference signal.

4. A control method for an optical disk apparatus including: a rotation driving section on which an optical disk is to be mounted and which drives the optical disk so as to be rotated; a light source; an objective lens for converging light from the light source onto an optical disk mounted on the rotation driving section; and a photodetector having at least two detection sections for detecting reflected light, from the optical disk, of the light, the method comprising the step of:

deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens, wherein, the step of generating a position error signal includes:

a step of deriving a difference between the signals respectively obtained from the two detection sections of the photodetector and generating a difference signal;

a step of deriving a sum of the signals respectively obtained from the two detection sections of the photodetector and generating a sum signal;

a step of adjusting an offset in the sum signal; and a step of dividing the difference signal by the sum signal whose offset has been adjusted to generate the position error signal, and the step of adjusting the offset in the sum signal adjusts the offset in the sum signal so that error signals obtained at no less than two different positions along a radial direction of the optical disk have an equal amplitude.

5. The control method for an optical disk apparatus of claim 4, wherein, the step of adjusting the offset in the sum signal adjusts, from the sum signal, a value a that satisfies:

$a=(E1 \times S2-E2 \times S1)/(E1-E2),$ where E1 and S1 are amplitudes of the difference signal and the sum signal at a first position on the optical disk; and E2 and S2 are amplitudes of the difference signal and the sum signal at a second position on the optical disk.

6. A control method for an optical disk apparatus including: a rotation driving section on which an optical disk is to be mounted and which drives the optical disk so as to be rotated; a light source; an objective lens for converging light from the light source onto an optical disk mounted on the rotation driving section; and a photodetector having at least two detection sections for detecting reflected light, from the optical disk, of the light, the method comprising the step of:

deriving a difference signal and a sum signal of respective outputs from the two detection sections of the photodetector, adjusting an offset in at least the sum signal among the difference signal and the sum signal, and thereafter dividing the difference signal by the sum signal whose offset has been adjusted to generate a position error signal of the objective lens, wherein, the step of generating the position error signal includes:

a step of adjusting offsets in the signals respectively obtained from the two detection sections of the photodetector;

a step of deriving a difference between the signals whose offsets have been adjusted, and generating a difference signal;

a step of deriving a sum of the signals whose offsets have been adjusted, and generating a sum signal; and a step of dividing the difference signal by the sum signal to generate the position error signal, and the step of adjusting the offsets adjusts, from the signals obtained from the detection sections, values e and f that satisfy:

$e=\{E3 \times (2 \times S4+E4p-E4n)-E4 \times (2 \times S3-E3p-E3n)\}/\{4 \times (E3-E4)\}$ and $f=\{E3 \times (2 \times S4-E4p+E4n)-E4 \times (2 \times S3-E3p+E3n)\}/\{4 \times (E3-E4)\},$ where E3 and S3 are amplitudes of the difference signal and the sum signal at a first position on the optical disk; E3$p$ and E3$n$ are positive and negative components of the amplitude E3 of the difference signal; E4 and S4 are amplitudes of the difference signal and the sum signal at a second position on the optical disk; and E4$p$ and E4$n$ are positive and negative components of the amplitude E4 of the difference signal.

* * * * *